(Model.)
2 Sheets—Sheet 1.
W. A. C. OAKS.
FRUIT PARING MACHINE.
No. 315,158. Patented Apr. 7, 1885.
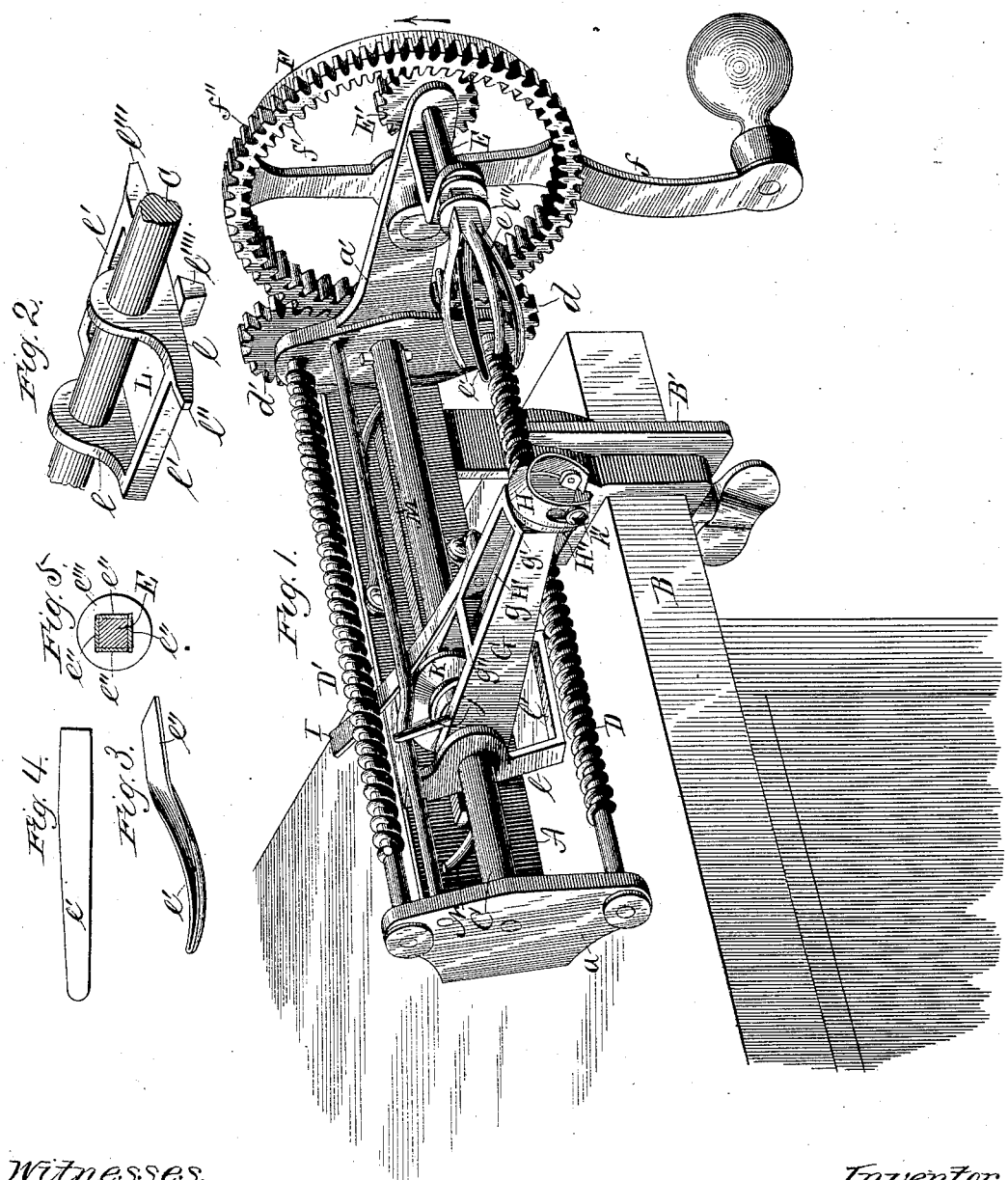
Witnesses.
Will P. Gunshurdro.
H. M. Richards.
Inventor.
Wm. A. C. Oaks,
By W. B. Richards,
Atty.

(Model.)
W. A. C. OAKS.
FRUIT PARING MACHINE.
No. 315,158. Patented Apr. 7, 1885.
2 Sheets—Sheet 2.
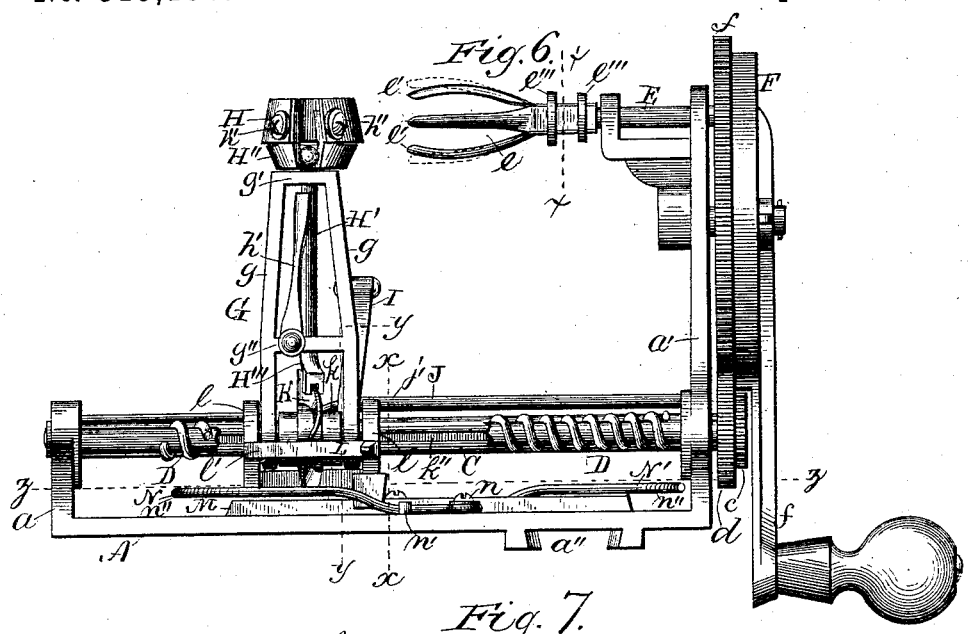
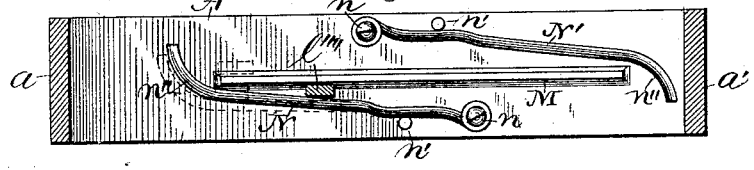
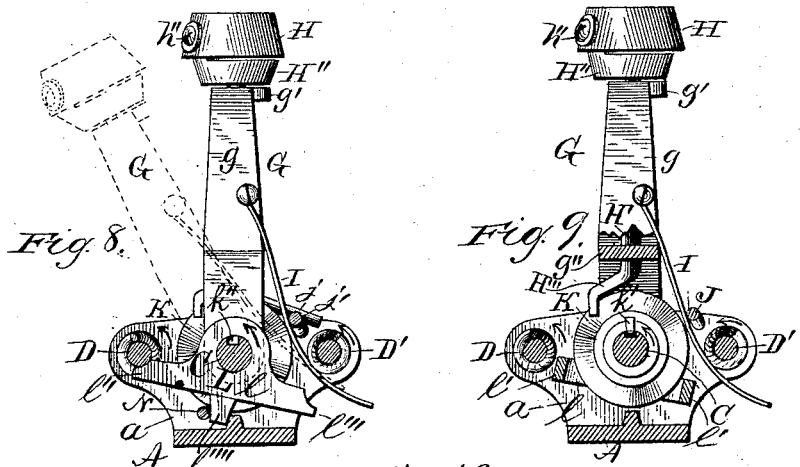
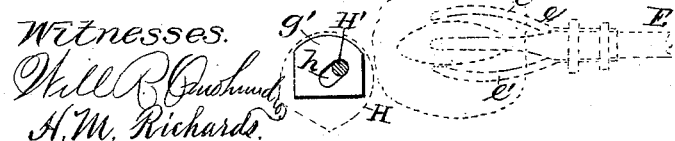
Witnesses.
Will R. Cushing
H. M. Richards.
Inventor
Wm. A. C. Oaks,
By W. B. Richards,
Atty.

UNITED STATES PATENT OFFICE.

WILLIAM A. C. OAKS, OF ANTRIM, NEW HAMPSHIRE, ASSIGNOR TO THE GOODELL COMPANY, OF SAME PLACE.

FRUIT-PARING MACHINE.

SPECIFICATION forming part of Letters Patent No. 315,158, dated April 7, 1885.

Application filed December 14, 1883. (Model.)

*To all whom it may concern:*

Be it known that I, WILLIAM A. C. OAKS, a citizen of the United States, residing at Antrim, in the county of Hillsborough and State of New Hampshire, have invented certain new and useful Improvements in Fruit-Paring Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention in its main features relates to that class of fruit-paring machines in which the fruit is held and rotated by a fork-shaft, parallel with which fork-shaft the frame which carries the paring-knife is fed by a feed-screw, with which feed-screw a segmental nut, connected with the paring-knife holder, is held in contact for that purpose, and in which the paring-knife frame is connected with a spring, which permits the paring-knife to yield from, while it is held by the spring in contact with, the fruit, while the knife traverses the surface thereof.

In paring-machines of the class referred to as heretofore constructed the knife-carrying frame is moved in one direction by the feed-screw, and in the reverse or return direction either by hand or by a spring while not in gear with the feed-screw; and the main object of my present invention is to provide means by which the frame which carries the paring-knife may be reciprocated back and forth, or moved in both directions, by a positive motion derived from the drive-wheel while rotated in one direction only; and to this end or object my invention consists in the use of two feed-screws, both in gear with the drive-wheel, and means for automatically gearing the knife-carrying frame with one feed-screw to traverse said frame in one direction, and with the other feed-screw to traverse said frame in the other direction, all as hereinafter described.

Another main object of my invention is to provide means for using, in the class of apple-parers hereinbefore described, a paring-knife which has an oscillating motion in connection with its ordinary movement past and around one side of the fruit; and to this end my invention consists in the use of a disk or wheel adapted to give said oscillating motion to the paring-knife while it traverses back and forth with the knife-holding frame.

The invention further consists in constructions and combinations, hereinafter described and claimed.

In the accompanying drawings, which illustrate one method of applying my improvements, Figure 1 is a perspective showing the parer fixed to a table ready for operation; Fig. 2, a perspective of a detail, the swinging frame carrying the segment-nuts; Fig. 3, a perspective of one of the fork-prongs; Fig. 4, a plan of a blank from which the fork-prongs are made; Fig. 5, a sectional elevation in line $x\ x$ in Fig. 6; Fig. 6, a plan of the parer seen from below when in position, as at Fig. 1, and partly broken away; Fig. 7, a plan of the base-plate and shifter for segment-nut frame and section in line $z\ z$ in Fig. 6; Fig. 8, a sectional elevation in line $x\ x$ in Fig. 6; Fig. 9, a sectional elevation in line $y\ y$ in Fig. 6; Fig. 10, a diagram or illustrative figure, hereinafter referred to.

Referring to the drawings by letters, the same letter indicates the same part in the different figures.

The frame of the machine consists of a base, A, with a standard, $a$, at one end and standard $a'$ at its other end. This frame is provided with ordinary means of attachment to a table, B, consisting of a clamping-bar, B', secured to the parer-frame by seating in a dovetailed groove, $a''$, in the base A. The bar B' is preferably secured to the parer-frame, as shown—that is, in such manner that the standards $a$ $a'$ may project outwardly about horizontally, whereby the paring-knife will "hang over," as shown at Fig. 1, and discharge the parings clear of the parer.

C is a guide-shaft, journaled at its ends in the standards $a\ a'$ a short distance above the base A. The end of the shaft C projects through the standard $a'$, and carries a pinion, $c$.

D D' are feed-screw shafts, also journaled at their ends in the standards $a\ a'$, one on each side of the shaft C. The screw-thread on the shaft D is a "right-hand" thread, and that on the shaft D' is a "left-hand" thread. The feed-screw shafts D D' extend through the standard a' and have pinions d d', respectively, on their extended ends.

E is the fork-shaft journaled in suitable bearings in the upper end of the standard a'. The fork-shaft E has a fork, e, at one end and a pinion, E', at its other end.

F is the drive-wheel with an ordinary crank, f, an internal gear, f', which gears with the pinion E', and an external gear, f'', which gears with the pinions c and d d'. The fork e is formed of prongs e', each stamped from a steel blank of the form substantially as shown at Fig. 4, into a form, as shown at Fig. 3. The flat parts e'' of the prongs are placed on the flat sides of the shaft E, and are held there by rings e'''. This construction not only makes a cheap fork, but an effectual fork also. The prongs being of tempered steel they will yield, as shown by dotted lines at Fig. 6, to permit them to pass over and hold a peach by clasping its seed, as shown at Fig. 10, and being of the form they are shown in their cross-sections, they are stiff enough, while still light, to hold the fruit securely.

G is the frame or arm which carries the paring-knife H. This frame G consists of two similar arms, g, through the lower ends of which the shaft C loosely passes. A head-plate, g', connects the upper ends of the arms g, and a bar, g'', connects them near their lower ends. The shaft H', to the upper end of which the knife H is fixed, has bearings in the plate g' and bar g''.

The bearing for the shaft H' in the plate g' consists of a slot, h, oblique to the shaft C, (see Fig. 10,) and a spring, h', secured at its lower end to the bar g'', presses the shaft H' toward the inner end of said slot into the position shown at same figure.

The knife-guard H'' is secured by a screw, h''', and consists of a sub-conical circular plate having rearwardly-extending arms, to which the knife is secured by stub-screws h''. The knife H consists of a strip or band of steel with its edge next the guard H'', sharpened and bent so as to partly encircle the guard H'', while its sharpened or paring edge is slightly exterior to the guard H'', as shown.

I is a spring, secured at one end to the knife-carrying frame G, and its other resting beneath and against the feed-screw D', so as to hold the frame G in position (shown by full lines in the drawings) and still permit it to swing outwardly from the fork E, as shown by dotted lines at Fig. 8, to pass around the fruit, and when the arm j, which is fixed to the frame G, slides upward on the higher part, j', of the rod J, for the purpose of clearing the knife H of the fork E in the ordinary manner while passing the fork.

K is a cam-shaped disk with bosses or hubs k loosely seated on the shaft C between the bars g, so that the disk may slide on the shaft C with the frame G, while it (the disk) is rotated therewith by means of a lug, k', which projects from the disk into a groove, k'', in said shaft. The shaft H' is bent at its lower end to form a crank, H''', which crank is forked at its outer end and rests astride the edge of the disk K, the edge of which is of such shape that rotation of the disk will impart an oscillating motion to the shaft H', and hence the same motion to the paring-knife H on the axis of the shaft H'.

L is a head formed of two plates, l, connected by plates l'. The arms g rest between the plates l, and the shaft C passes loosely through them. The head L has a projection or segment-nut, l'', on one side and a similar segment-nut, l''', projecting from its other side, which segment-nuts and frame L are so located that when the frame is tilted or turned in one direction on the shaft C the nut l'' will engage with the screw-thread on the shaft D, as shown at Figs. 1 and 8, and when tilted in the other direction the nut l''' will engage with the screw-thread on the shaft D'. A lug, l'''', projects downward from the mid-length portion of one of the plates l.

M is a rib or ledge which extends along the base A, as shown at Fig. 7.

N N' are similar springs, one on each side of the rib M. Each spring N is secured to the base A by a stud-bolt, n, and is held in its normal position by a stud, n', with the curved outer or free end, n'', of the spring in position, as shown at same figure.

In describing the operation of the parer I will suppose the frame G in the relative position to the base shown at Figs. 1 and 6, and the drive-wheel to be rotating in the direction shown by the arrow at Fig. 1. The shafts C D D' will then be rotated in the direction shown by the arrows at Figs. 8 and 9, while the lug l'''' is resting against that side of the rib M which will tilt the frame L, as shown at same figures, so as to hold the segment-nut l'' in gear with the feed-screw shaft D, by means of which the frame L, disk K, frame G, and the paring-knife will be carried toward the standard a until the lug l'''' reaches the end of the rib M, when the curved end n'' of the spring N will press the lug l'''' over past and to the other side of the rib M, thereby throwing the segment-nut l'' out of gear with the feed-screw shaft D, and bringing the segment-nut l''' into gear with the feed-screw shaft D', by means of the rotation of which the frame L, disk K, and paring-knife and frame will be moved along toward the standard a' until the lug l'''' reaches the end of the rib M next the standard a', when the spring N' will now press the lug l'''' over to the other side of the rib M and thereby swing the frame L again into the positions shown in Figs. 1 and 8, with the cam-nut in gear with the feed-screw shaft D, whereby the frame L, disk K, and paring knife and frame will be moved again toward the standard a, as already described, thus reciprocating the knife and knife-carrying frame back and forth on the rod by a continuous rotation of the drive-wheel.

While the paring-knife is being reciprocated back and forth, as last described, it is given an oscillating motion on the axis of the shaft H' by means of the rotating shaft C, disk K, and crank-arm H''', whereby its effectiveness is increased in paring soft fruit, such as peaches.

The manner in which the knife-yielding frame yields to permit the paring-knife to pass around the fruit, held on and rotated by the fork E, need not be herein more particularly described, as it is substantially the same as in similar parers of this class or type.

The fruit is placed on the fork while the knife-carrying frame is at that end of its track next the standard $a$, and as the knife comes in contact with the fruit against its end, as shown at Fig. 10, the shaft H' will yield backward in the slot $h$ and thus facilitate the knife in paring the end of the fruit thoroughly by retarding the advance of the knife with the frame G while the end is pared.

It will be evident that both feed-screws D D' may have the same right-hand or the same left-hand threads by gearing one of the feed-screws with the drive-wheel, so as to rotate it in an opposite direction from the other feed-screw; hence I do not limit my claims to the feed-screws having opposed screw-threads; neither do I limit my claim to the specific method shown of actuating the shaft H' from the shaft C, as it may be done in various ways; neither do I limit my claims specifically to the shifting-frame L, as other means of shifting the gear from one of the shafts D or D' to the other may be substituted; but

What I claim as new, and desire to secure by Letters Patent, is—

1. In a fruit-paring machine, in combination, substantially as described, a drive-wheel, a guide-shaft on which the paring-knife-carrying frame slides, two feed-screws, said guide-shaft and feed-screws all geared with and rotated by the drive-wheel, a rotating fruit-holding fork, a rocking frame which reciprocates the knife-carrying frame, and a trip mechanism which throws said rocking frame into gear alternately with the feed-screws.

2. In a fruit-paring machine, in combination with the two feed-screws, the knife-carrying frame, and the guide-shaft on which it reciprocates, a frame which carries segment-nuts adapted to gear alternately with the two feed-screws, substantially as described, and for the purpose specified.

3. In a fruit-paring machine, in combination with the two feed-screws, the knife-carrying frame, guide-shaft on which it reciprocates, a swinging frame provided with segment-nuts adapted to gear alternately with the feed-screws, and also provided with a lug or projection, and a rib, M, and springs N N', adapted to tilt the swinging frame, substantially as and for the purpose specified.

4. In a fruit-paring machine, in combination with a sliding knife-carrying frame and feed-screws adapted to move it in opposite directions, a swinging frame adapted to gear the sliding frame with the feed-screws alternately, substantially as and for the purpose specified.

5. In a fruit-paring machine, in combination with the guide-shaft C, a knife-holding frame, and a feed-screw for moving the knife-holding frame parallel with the fruit-holding fork, a shaft having its bearing in the knife-holding frame and having the fruit-paring knife secured to its upper end, and a crank at its lower end, and a cam wheel or disk mounted on the guide-shaft and adapted to oscillate the paring-knife, substantially as and for the purpose specified.

6. In a fruit-paring machine of the class herein described, the combination of a knife-carrying frame, a fruit-holding fork, a feed-screw for reciprocating the knife-frame past said fork, an oscillating knife having a shaft, H', and a rotating shaft, C, provided with a device for oscillating said shaft H' and knife, substantially as described.

7. In combination, the shaft C, sliding cam-disk K, knife-carrying frame G, having a slot, $h$, knife H, shaft H', and crank H''', substantially as and for the purpose specified.

8. In combination, the guide-shaft C, sliding knife-carrying frame, and knife fixed to the shaft H', and the upper bearing-plate, $g'$, having an oblique slot, $h$, which permits the knife to yield, substantially as and for the purpose specified.

9. In a fruit-paring machine, in combination, a knife-carrying frame having a slot, $h$, a paring-knife fixed to a shaft, H', and a spring, $h'$, adapted to press the shaft H' obliquely in the slot $h$, substantially as and for the purpose specified.

10. In a fruit-paring machine, the fork-prongs $e'$, constructed from steel blanks, bent in their cross-sections, and formed as described, for the purpose specified.

11. In a fruit-paring machine, the fork-prongs constructed from steel blanks, bent and formed as described, and secured to the shaft E by rings $e'''$, substantially as set forth.

In testimony whereof I affix my signature in presence of two witnesses.

WILLIAM A. C. OAKS.

Witnesses:
   CHAS. S. ABBOTT,
   H. A. HURLIN.